United States Patent
Konno et al.

(10) Patent No.: US 6,987,446 B2
(45) Date of Patent: Jan. 17, 2006

(54) MOTORCYCLE ANTI-THEFT DEVICE

(75) Inventors: Takeshi Konno, Wako (JP); Tadashi Onozuka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/672,935

(22) Filed: Sep. 26, 2003

(65) Prior Publication Data
US 2004/0164850 A1     Aug. 26, 2004

(30) Foreign Application Priority Data
Sep. 26, 2002   (JP)   ............................. 2002-281257

(51) Int. Cl.
*B60R 25/10*     (2006.01)
(52) U.S. Cl. .................. 340/426.1; 340/427; 340/432; 340/825.36; 340/825.49; 340/825.69; 340/518; 340/521
(58) Field of Classification Search ............ 340/426.1, 340/427, 432, 825.36, 825.49, 825.69, 518, 340/521, 5.72
See application file for complete search history.

(56) References Cited
U.S. PATENT DOCUMENTS
5,124,565 A * 6/1992 Yoshida et al. .............. 307/9.1
5,828,317 A * 10/1998 Togashi ................. 340/825.69
6,768,219 B2 * 7/2004 Konno ........................ 307/9.1
2004/0113760 A1 * 6/2004 Tanaka ..................... 340/426.1

FOREIGN PATENT DOCUMENTS
JP          07223508 A     8/1995

* cited by examiner

*Primary Examiner*—Daniel Wu
*Assistant Examiner*—Tai T. Nguyen
(74) *Attorney, Agent, or Firm*—Carrier, Blackman & Associates, P.C.; Joseph P. Carrier; William D. Blackman

(57) ABSTRACT

Multiple components of a motorcycle theft-deterrent device are enclosed within a single weather-resistant module, to ensure that wiring thereof is protected from the elements. The theft-deterrent device permits secure starting of the engine with a remotely operated device. The theft-deterrent device includes a CPU 41, a remote control receiver 42 for detecting a locking/unlocking signal from a remote operation device, and a vibration sensor 43 as theft-deterrent equipment in a handlebar lock module 12, including a handlebar lock mechanism. As a result of this inclusion, wiring is protected. The protected wiring sends locking/unlocking signals, which have been received by the remote control receiver 42, to the CPU 41, as well as vibration sense signals from the vibration sensor 43 to the CPU 41, for protecting the vehicle body.

20 Claims, 3 Drawing Sheets

MOTORCYCLE ANTI-THEFT DEVICE

CROSS-REFERENCE TO RELATED APPLICATIONS

The present application claims priority under 35 U.S.C. 119 based on Japanese patent application No. 2002-281257, filed Sep. 26, 2002.

BACKGROUND OF THE INVENTION

1. Field of the Invention

The present invention relates to a motorcycle anti-theft device, and more particularly, relates to a motorcycle anti-theft device which fits easily on a motorcycle, and which is compact and pleasing in appearance.

2. Description of the Background Art

Many vehicle theft-deterrent devices are known and commercially available. In some of the known theft-deterrent devices, a control signal, sent from outside the vehicle by a remote operation device, is received inside the vehicle, and permission is then given to start the engine when the control signal is recognized as a familiar signal.

For example, a motorcycle alarm device is disclosed in Japanese Patent laid-open Publication No. Hei 7-223508, where a switch, provided on a stand, and an ignition switch operate in cooperation, so that a horn is sounded on the vehicle when the vehicle is improperly moved.

Further, a theft-deterrent device is disclosed in Japanese Utility Model Gazette Registration No. 2558117, where an operation unit and a numeric keypad are provided on a motorcycle or a three-wheeled vehicle. In the disclosure of this reference, a card is inserted into the operation unit, and a vehicle registration number or secret identification number, for activating the ignition and lighting switches, is electronically stored on the card. After the card has been inserted, the secret identification number is manually entered using the numeric keypad, and permission to start the engine is given only when the manually entered number matches the secret identification number stored on the card.

In many instances, vehicle theft can be effectively prevented by theft-deterrent devices incorporating remote-control switches, because starting of an engine is only permitted by a person in possession of the correct remote control activation device. When using theft-deterrent devices adopting cards, starting of the engine is only permitted by a person that (a) is in possession of a card, and (b) is also aware of the secret identification number stored thereon.

In the vehicle security industry, theft-deterrent devices are often installed after the initial sale of a vehicle. This operation of installing a theft-deterrent device subsequent to the initial sale is difficult for a typical user to carry out without help, and therefore, may be entrusted to a maintenance facility or a shop, which can be time-consuming and troublesome.

Further, in the case of affixing theft-deterrent devices after the initial sale, the external appearance of the vehicle may be compromised due to wiring, etc. being exposed on the vehicle. Moreover, differentiation between an alarm noise and a theft notification noise may be difficult, because the horn provided on the vehicle is used both for normal use and as a burglar alarm, and the position of the horn is substantially fixed with regards to this function. As a result, layout options in placing components of the theft-deterrent device on the vehicle body are very limited.

SUMMARY OF THE INVENTION

In order to resolve the aforementioned problems, in a first aspect of the present invention, a theft-deterrent device, equipped with a receiver and a processor, is provided for a vehicle which may be a motorcycle. The receiver receives a locking/unlocking signal from a remote control activation device. The on-vehicle processor determines whether or not an ID included in the locking/unlocking signal matches a pre-registered ID number.

The theft-deterrent device according to the first aspect also includes a lock mechanism for responding to the locking/unlocking signal and operating the lock, and an actuator for driving the lock mechanism. The theft-deterrent device further includes a theft-detection signal generator for creating and transmitting a theft-detection signal, when a vehicle is subjected to inappropriate movement, without receiving an unlocking signal including the proper registration ID number. In the theft-deterrent device according to the first aspect hereof, the receiver, controller, lock mechanism, actuator and theft-detection signal generator may be formed as parts within a unitary module, and housed within a single housing.

According to the first aspect, the receiver for receiving the locking/unlocking signal, as well as the actuator for locking and unlocking the vehicle and the theft-detection means are configured in a single module. Wiring is therefore simplified and can be collected together within the housing, to create a clean and superior external appearance.

In a second aspect of the invention, the lock mechanism is provided in the form of a handlebar lock for engaging with a rotating shaft of a handlebar so as to lock a vehicle, and the module is arranged next to the rotating shaft of the handlebar which the lock mechanism engages. The distance which the lock pin, etc. is required to move can therefore be made short, and the lock pin mechanism is simplified.

Further, in a third aspect of the present invention, the theft-detection mechanism uses a vibration sensor to detect when the vehicle is moved without performing the correct operations, and generates a corresponding theft-detection signal.

According to the third aspect, a theft-detection signal is generated when the vehicle is inappropriately moved, or is subjected to shocks.

In a fourth aspect of the present invention, the theft-detection sensor detects when the steering angle of the handlebar changes by a predetermined amount, without the required preliminary operations being performed, and the mechanism then emits a theft-detection signal.

Further, in a fifth aspect of the present invention, a buzzer energized in response to the theft-detection signal is provided, and notification of theft can be given using the buzzer. In a sixth aspect, the buzzer is included in the module, and according to the sixth aspect, wiring for the buzzer protected and is not exposed to the outside elements.

Moreover, in a seventh aspect of the present invention, a pivotally movable seat is provided which also serves as a lid for a storage box, with the seat being alternately lockable and releasable in response to the locking/unlocking signal, when the ID numbers match.

According to the seventh aspect, the locking or unlocking of the vehicle and the seat can be carried out at the same time.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

A detailed description will now be given of a selected illustrative embodiment of the present invention, with reference to the drawings.

Figure 1:
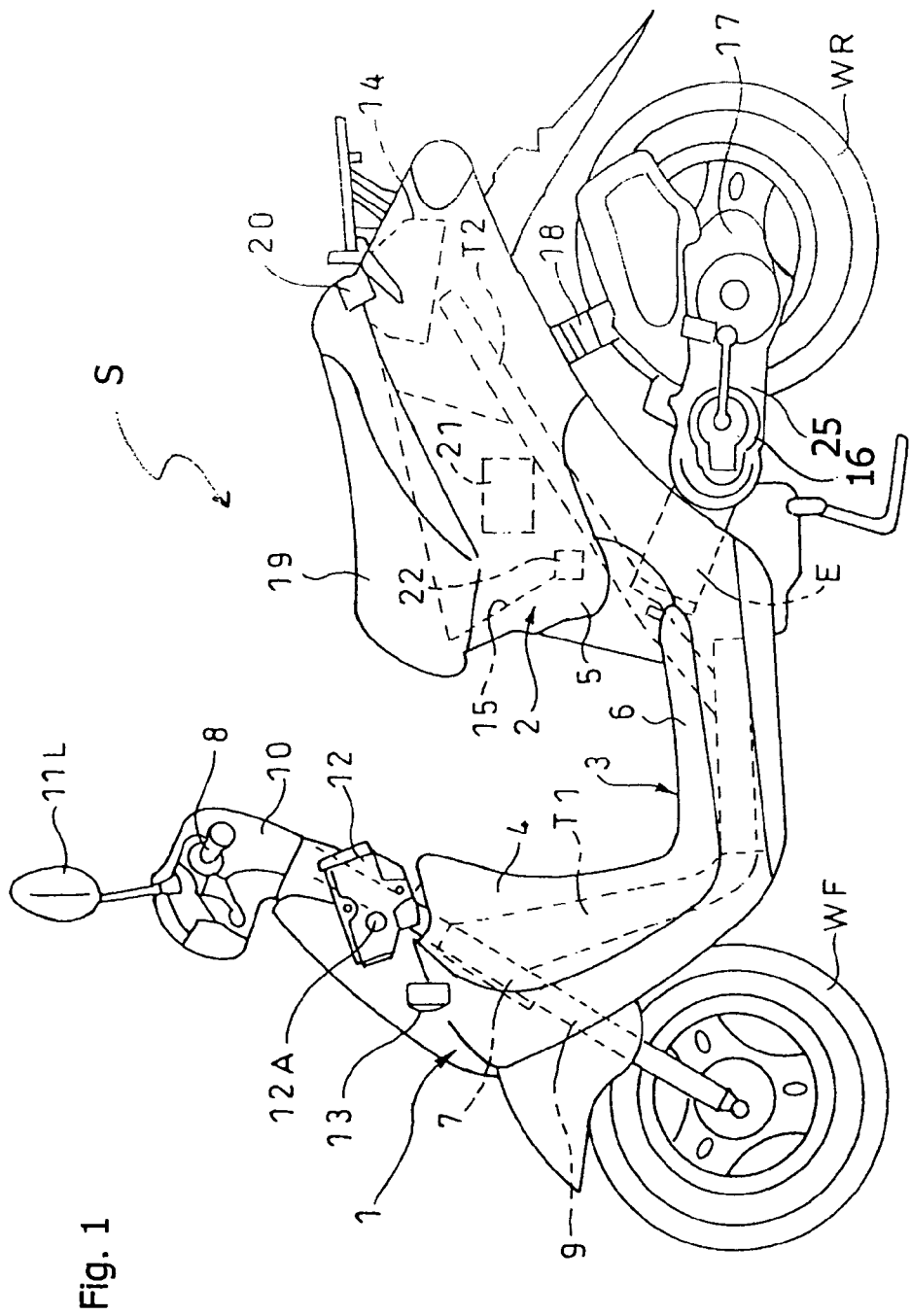
FIG. 1 is a side plan view of a two-wheeled scooter-type vehicle having a theft-deterrent device installed thereon according to a selected illustrative embodiment of the present invention.

FIG. 1 is a side plan view of a two-wheeled scooter-type vehicle S having a theft-deterrent device 100 installed thereon, according to a selected illustrative embodiment of the present invention. However, a typical simplified outline of the vehicle S is shown, to aid in understanding the arrangement of the theft-deterrent device 100 and its related equipment.

Scooter Structure and Composition

As shown in the drawing, the scooter S includes a vehicle front end 1 and a vehicle back end 2, connected via a low floor portion 3. The framework for the scooter S is provided by a vehicle frame, including a down tube $T_1$ and a main frame pipe $T_2$.

The vehicle front end 1, vehicle back end 2 and floor portion 3 are covered by a front cover 4, body cover 5, and center cover 6, respectively. A handlebar 8 is provided towards the top of the vehicle front end 1, and is axially supported at the steering head 7. The handlebar 8 is covered by a handlebar cover 10. The vehicle front end 1 of the scooter S is further provided with a front fork 9, attached to the lower end of the handlebar 8 and extending below the steering head, and with a front wheel $W_F$ axially supported at a lower end of the front fork.

Handgrip portions of the handlebar 8 project laterally outwardly from the handlebar cover 10, with a left side mirror 11L projecting upwards from the left side of the handlebar. Although the right side mirror is not shown in the drawing, it will be understood that the right side mirror is substantially a mirror image of the left side mirror, and is located on the right side of the scooter S, in a corresponding position with respect to the handlebar 8.

Further, a handlebar lock module 12 housing a lock mechanism is also provided, in a single housing, for locking the position of the handlebar 8. The handlebar lock module 12 has a lock pin 12A for engaging with a rotating shaft (handlebar post) 24 of the handlebar 8. The lock pin 12A is made to move in a reciprocal manner by an actuator such as a motor, etc. so as to engage and disengage with the handlebar post 24, causing locking and unlocking thereof. The lock pin 12A may be driven by the operation of a remote control key, described hereinbelow. The handlebar lock module 12 is also described in further detail below.

An alarm buzzer 13 is provided attached to the front end 1 of the vehicle S, in the vicinity of the handlebar lock module 12. The alarm buzzer 13 is provided separately from the vehicle horn used during normal stop-and-go operation of the vehicle S. The handlebar lock module 12 and the alarm buzzer 13 are shown separately in the drawing using solid lines, but are housed within the front cover 4.

A fuel tank 14 and storage box 15 are provided within the body cover 5, so as to be supported by the main frame pipe $T_2$. A single-cylinder four-cycle engine E, a belt-type infinitely variable transmission 16 in back of the engine E, and a reduction gear mechanism 17 are also included at a swing unit 25, pivotally supported to swing vertically with respect to the main frame pipe $T_2$, within a limited range of motion. The reduction gear mechanism 17 has a rear wheel $W_R$ axially supported thereon. A rear shock-absorbing cushion 18 is installed between the upper end of the reduction gear mechanism 17 and the main frame pipe $T_2$.

A seat cover member 19 is provided to cover the storage box 15 above the body cover 5. The seat cover member 19 can be opened and closed, and it is possible to store a helmet, etc. in the storage box 15. A seat lock actuator 20, capable of being operated by remote control key, is provided between the seat 19 and the main frame pipe $T_2$. A main relay 22 is installed within the body cover 5, for connecting a power supply to an ECU 21 and related electrical components, etc. for controlling the engine.

Circuit Structure

Figure 2:
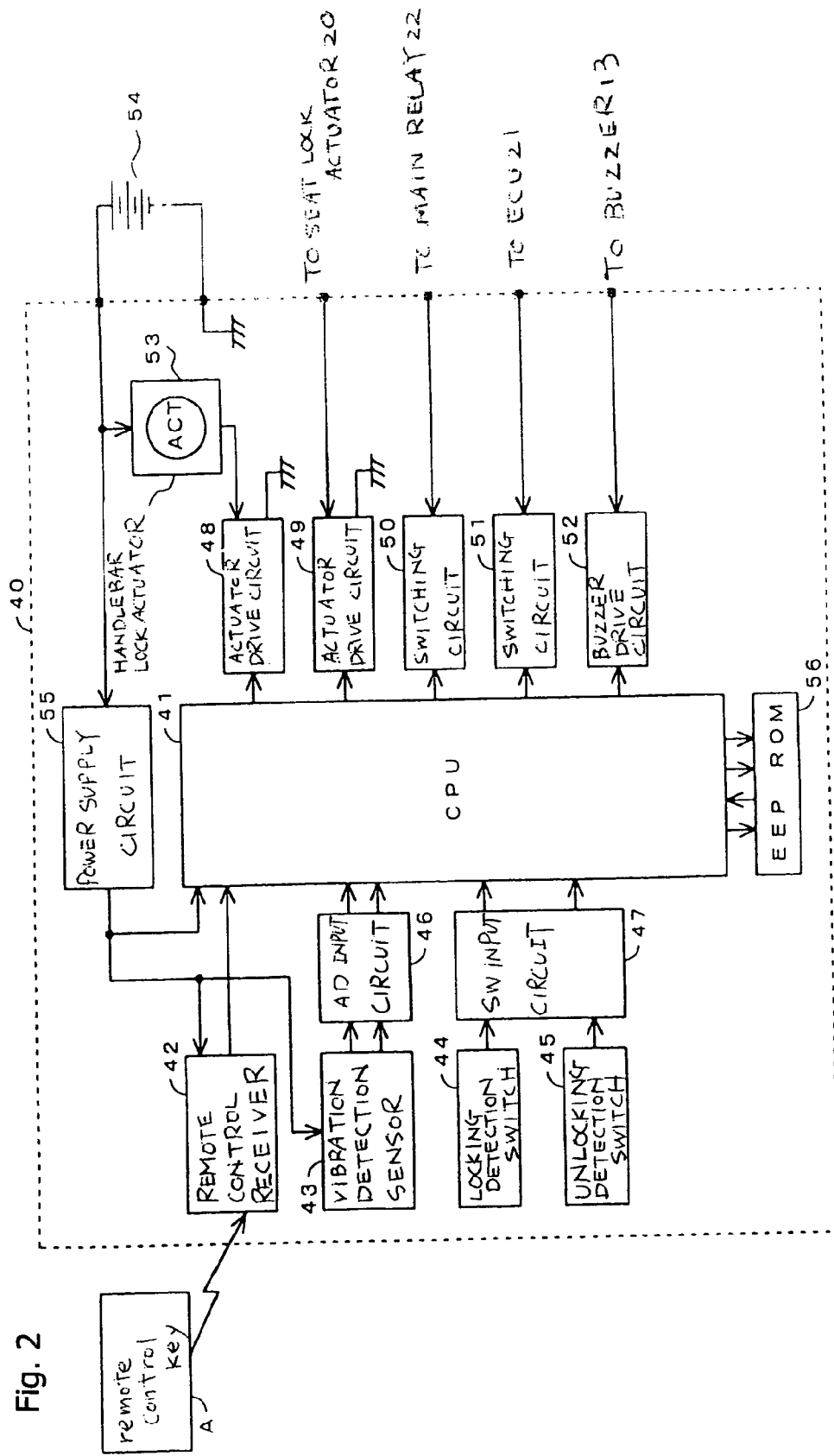
FIG. 2 is a block circuit diagram showing a controller according to a first embodiment thereof.

FIG. 2 is a block circuit diagram showing an example of a controller 40 built into the handlebar lock module 12. The controller 40 is equipped with a processor (CPU) 41 and a remote control receiver 42 for receiving signals from a remote control key A, and for transferring the received signals to the CPU 41. The remote control receiver 42 receives a locking signal or unlocking signal sent from a remote control key (remote operation device) A. The controller 40 also includes a vibration sensor 43, a locking detection switch 44, and an unlocking detection switch 45.

The locking detection switch 44 and the unlocking detection switch 45 detect respective locking and unlocking positions of the lock pin 45. In an optional embodiment, the locking and unlocking detection switches 44, 45 can be combined into a single lock position sensor.

The vibration sensor 43 senses vibrations applied to the handlebar lock module 12, and when the sensed vibration exceeds a predetermined magnitude, the CPU 14 sends out a theft-detection signal. The locking detection switch 44 detects when the lock pin 12A is in a position of engaging with the handlebar post 24 and sends out a locking position signal. The unlocking detection switch 45 detects when the lock pin 12A is in a position of releasing from engagement with the handlebar post 24 and sends out an unlocking position signal. As noted, these two switches may be combined into a single lock position sensor.

The vibration detection signal is input to the CPU 41 via an A/D input circuit 46 and the locking signal and unlocking signal are sent to the CPU 41 via a switch input circuit 47.

First and second actuator drive circuits 48 and 49, switching circuits 50 and 51, and a buzzer drive circuit 52 are provided on the output side of the CPU 41. The first actuator drive circuit 48 is connected to an actuator 53 for driving the lock pin 12A, and an actuator 53 is connected to a positive side of the battery 54. The first actuator driver circuit 48 is connected to an actuator 53 for driving the lock pin 12A, and the actuator 53 is connected to a positive side of the battery 54. The second actuator driver circuit 49 is connected to a seat lock actuator 20.

The output side of the switching circuit 50 is connected to the main relay 22 and the output side of the switching circuit 51 is connected to the ECU 21. Further, the output side of the buzzer drive circuit 52 is connected to the buzzer 13.

A power supply circuit 55, connected to the positive side of the battery 54 is also provided, for supplying appropriate power supply voltages to the remote control receiver 42, the vibration sensor 43, the actuator 53 and the CPU 41. An EEPROM 56 is provided at the CPU 41, as a device for storing required data.

In the above configuration, when an unlocking signal is sent by the remote control key A, and when the CPU 41 determines that an ID included in the unlocking instruction sent from the remote control key matches a registration ID registered in the EEPROM 56, the actuator driver circuit 48 drives the actuator 53 and unlocks the handlebar.

At the same time, the second actuator drive circuit 49 drives the seat lock actuator 20 for the seat 19 that doubles as a lid for the storage box 15, which is initially locked. The actuator switching circuit 50 operates when the CPU 41 determines that the ID included in an unlocking instruction sent by the remote control key A matches with the registration ID, or when the detection output of the unlocking detection switch 45 is received.

The main relay 22 is driven when the switching circuit 50 is operated, so that when the main switch (not shown) of the vehicle is on, power is supplied to electrical equipment including an ignition assembly, and starting of the engine is made possible.

However, the main relay 22 does not turn on if the IDs do not match, and the engine cannot be made to start without the remote control key A. Further, in cases where the handlebar lock module 12 is damaged or removed in order to move the vehicle without using the remote control key A, vibration is sensed that does not occur during a normal start operation.

When vibrations detected by the vibration sensor 43 are compared with the reference value set in the EEPROM 56 and determined to be abnormal, the CPU 41 energizes the buzzer drive circuit 52 and the buzzer 13 is activated. In order to stop the sound of the buzzer 13, the remote control key A is used, an unlocking signal is generated, and a correct ID is supplied to the remote control receiver 42. The program of the CPU 41 is configured in such a manner that the handlebar lock is unlocked by the correct unlocking signal, to stop the sound of the buzzer 13.

In this embodiment, the remote control receiver 42, the vibration sensor 43, the handlebar lock pin 12A, the first actuator drive circuit 48 and control hardware including the CPU 41 are housed within the handlebar lock module 12. It is therefore possible to maintain a clean, uncluttered and superior external appearance because wiring between the remote control receiver 42 and the vibration sensor 43 and the CPU 41 is not routed to, or exposed to the outside. The alarm buzzer 13 is also separate from the horn used during normal stop-and-go driving, which gives freedom with respect to layout. The alarm buzzer 13 is also housed within the handlebar lock module 12 so that the wiring for the alarm buzzer 13 is not routed to, or exposed to the outside.

Further, it is also possible to adopt a structure where a steering angle sensor is provided for the handlebar 8, in place of the vibration sensor, so that the alarm buzzer 13 is activated when the steering angle changes by more than a predetermined amount, even when no unlocking signal has been received from the remote control key A. Where used, the steering angle sensor is also housed within the handlebar lock module 12, in the same way as the vibration sensor 43.

The steering angle sensor can also be used to provide steering angle information for an automatic turn-signal indicator lamp canceller, and can also be housed in the handlebar lock module 12, together with an automatic turn-signal indicator lamp canceller.

Figure 3:
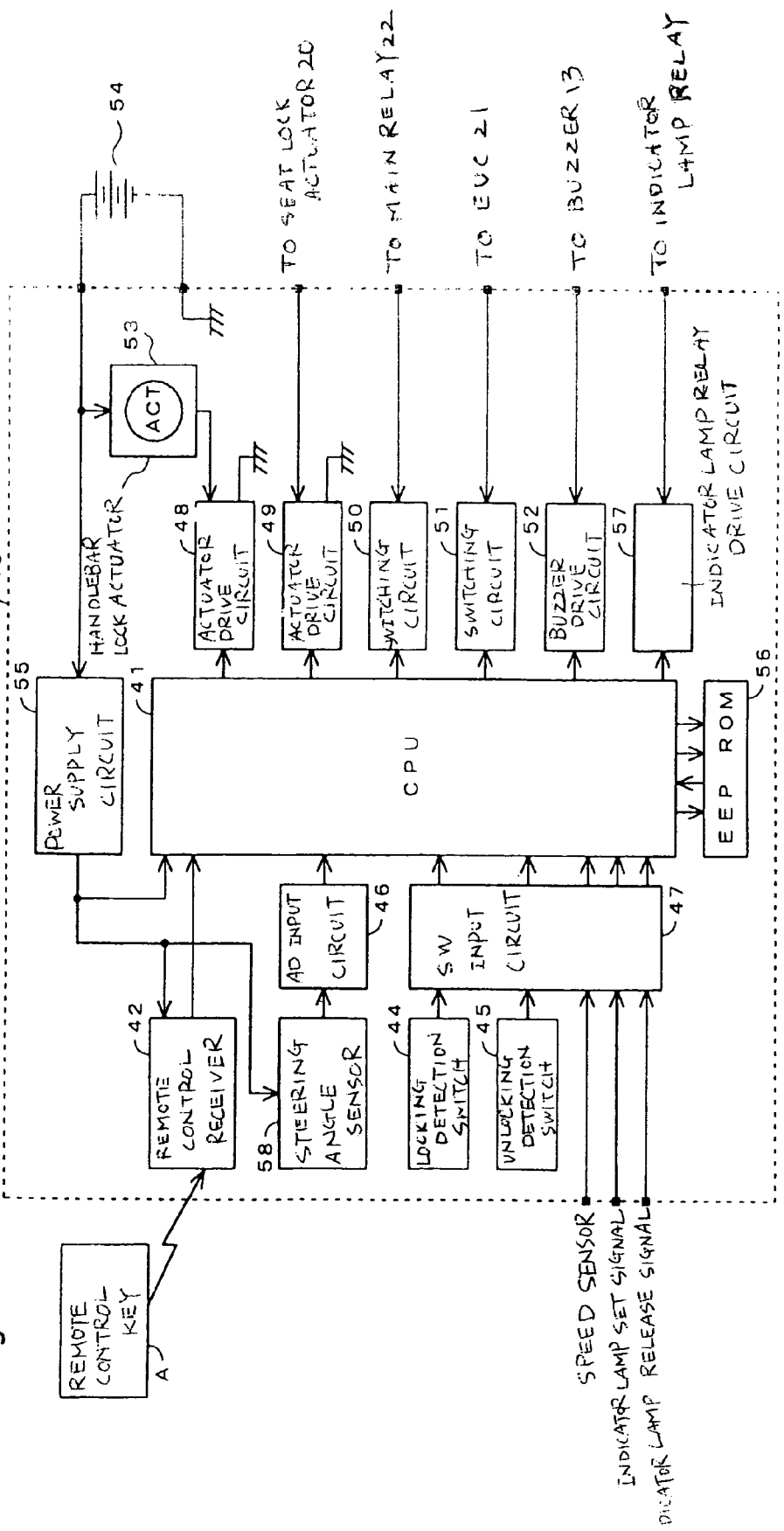
FIG. 3 is a black circuit diagram showing a modified example of a controller according to a second embodiment thereof.

FIG. 3 is a block circuit diagram showing a modified example of a controller built into the handlebar lock module 12, with numerals that are the same as in FIG. 2 being used for the same or equivalent components. Detection signals from an external vehicle speed sensor, a turn-signal indicator lamp set signal, and a turn-signal indicator lamp release signal are sent to the switch input circuit 47. A turn-signal indicator lamp relay drive circuit 57 is connected to the output side of the CPU 41. This turn-signal indicator lamp relay drive circuit 57 is connected to an external turn-signal indicator lamp relay (not shown). Further, a steering angle sensor 58 is provided for detecting the handlebar steering angle. In addition to acting as a theft-detection means, the steering angle sensor 58 also acts as an automatic turn-signal indicator lamp canceling sensor.

During operation of the turn-signal indicator lamps, a turn-signal indicator lamp set signal is generated, and the turn-signal indicator lamp relay drive circuit 57 turns the turn-signal indicator lamp relay on so that the turn-signal indicator lamp is made to flash. When a turn-signal indicator lamp release signal is sensed through a turn-signal indicator lamp return operation, the turn-signal indicator lamp drive circuit 57 turns off the turn-signal indicator relay and the turn-signal indicator lamp.

Even when a turn-signal indicator lamp return operation is not carried out, when straight ahead movement is detected, based on the steering angle using the steering angle sensor 58, the same operation is performed as for the turn-signal indicator lamp return operation. Further, when vehicle speed is greater than an expected speed, a detection signal of a vehicle speed sensor may be added to the turn-signal indicator lamp return conditions, to give the same operation as for the turn-signal indicator lamp return operation.

As is clear from the above description, according to the invention as disclosed in the first aspect, structure for receiving the locking and unlocking signals and locking and unlocking the vehicle, as well as a theft-detection sensor, are configured in a single module. Wiring is therefore short and can be collected together within the housing, bringing about a superior external appearance.

According to the invention as disclosed in the second aspect hereof, a module including the lock mechanism is arranged next to the rotating shaft of the handlebar with which the lock mechanism engages. The distance which the lock pin etc. is required to move can therefore be made short, and the lock mechanism is simplified.

According to the invention as disclosed in the third aspect hereof, a theft-detection signal is generated when the vehicle is moved inappropriately or is subjected to shocks. According to the invention as disclosed in the fourth aspect hereof, a theft-detection signal is generated when the handlebar is operated inappropriately.

According to the invention as disclosed in the fifth aspect hereof, notification of theft can be given using the alarm buzzer. According to the invention as disclosed in the sixth aspect hereof, wiring for the alarm buzzer and the controller etc. can be made short and can be collected within the housing so that the external appearance is superior.

According to the invention as disclosed in the seventh aspect hereof, the locking and unlocking of the vehicle and the locking and unlocking of the seat can be carried out at the same time.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

What is claimed is:

1. A theft-deterrent device for a vehicle, comprising:
   a receiver for receiving at least one lock position signal from a remote operation device;
   a processor for determining whether or not an ID included in the lock position matches a stored ID;
   a primary lock mechanism for responding to the lock position signal when the IDs match to lock or unlock the vehicle;
   an actuator for driving the primary lock mechanism, and
   a theft-detection unit detecting movement and rot generating an alarm signal when the vehicle is moved when the receiver has not received an unlocking signal including an ID matching the stored ID;
   wherein the receiver, processor, primary lock mechanism, actuator and theft-detection unit are comprised in a module within a single housing.

2. The theft-deterrent device of claim 1, wherein the theft-deterrent device is for a two-wheeled vehicle having a handlebar, and the primary lock mechanism is engageable with a rotating shaft of the handlebar to lock a vehicle, and wherein the module is adapted to be situated near the rotating shaft of the handlebar.

3. The theft-deterrent device of claim 1, wherein the theft-detection unit comprises a vibration sensor, and is configured to detect when the vehicle is moved without a required operation having been performed, and to generate a theft-detection signal in response to such movement.

4. The theft-deterrent device of claim 1, further comprising an alarm buzzer which is capable of being energized in response to the theft-detection signal.

5. The theft-deterrent device of claim 4, wherein the alarm buzzer is separate from a vehicle horn, and is included within said module.

6. The theft-deterrent device of claim 1, further comprising a seat lock, wherein the theft-deterrent device is for a two-wheeled vehicle having a seat, and the seat lock is locked and unlocked in coordination with locking and unlocking of said primary lock mechanism.

7. The theft-deterrent device of claim 1, further comprising a seat lock, wherein the theft-deterrent device is for a two-wheeled vehicle having a seat, and the seat lock is locked and unlocked in coordination with locking and unlocking of said primary lock mechanism.

8. A theft-deterrent device for a vehicle, comprising:
   a receiver for receiving at least one lock position signal from a remote operation device;
   a processor for determining whether or not an ID included in the lock position matches a stored ID:
   a primary lock mechanism for responding to the lock position signal when the IDs match to lock or unlock the vehicle;
   an actuator for driving the primary lock mechanism, and
   a theft-detection unit detecting movement and for generating an alarm signal when the vehicle is moved when the receiver has not received an unlocking signal including an ID matching the stored ID;
   wherein the receiver, processor, primary lock mechanism, actuator and theft-detection unit are comprised in a module within a single housing, and
   wherein the theft-detection unit comprises a steering angle sensor and is configured to detect when a handlebar steering angle has been changed by a predetermined amount without a required operation having been performed, and to generate a theft-detection signal in response to such change in the steering angle.

9. A theft-deterrent device for a vehicle, comprising:
   a receiver for receiving at least one lock position signal from a remote operation device;
   a processor for determining whether or not an ID included in the lock position matches a stored ID;
   a lock mechanism for responding to the lock position signal when the IDs match to lock or unlock the vehicle;
   an actuator for driving the lock mechanism, and
   a theft-detection unit detecting movement and for generating an alarm signal when the vehicle is moved when the receiver has not received an unlocking signal including an ID matching the stored ID;
   wherein the receiver, processor, lock mechanism, actuator and theft-detection unit are comprised in a module within a single housing;
   and further wherein the primary lock mechanism is engageable with a rotating shaft of a handlebar to lock a vehicle, and the module is situated near the rotating shaft of the handlebar.

10. The theft-deterrent device of claim 9, wherein the theft-detection unit comprises a vibration sensor, and is configured to detect when the vehicle is moved without a required operation having been performed, and to generate a theft-detection signal in response to such movement.

11. The theft-deterrent device of claim 9, further comprising an alarm buzzer which is capable of being energized in response to the theft-detection signal.

12. The theft-deterrent device of claim 11, wherein the alarm buzzer is separate from a vehicle horn, and is included within said module.

13. The theft-deterrent device of claim 9, further comprising a seat lock, wherein the theft-deterrent device is for a two-wheeled vehicle having a seat, and the seat lock is locked and unlocked in coordination with locking and unlocking of said primary lock mechanism.

14. A theft-deterrent device for a vehicle, comprising:
   a receiver for receiving at least one lock position signal from a remote operation device;
   a processor for determining whether or not an ID included in the lock position matches a stored ID;
   a lock mechanism for responding to the lock position signal when the IDs match to lock or unlock the vehicle;
   an actuator for driving the lock mechanism, and
   a theft-detection unit detecting movement and for generating an alarm signal when the vehicle is moved when the receiver has not received an unlocking signal including an ID matching the stored ID;
   wherein the receiver, processor, lock mechanism, actuator and theft-detection unit are comprised in a module within a single housing;
   and further wherein the primary lock mechanism is engageable with a rotating shaft of a handlebar to lock a vehicle, and the module is situated near the rotating shalt of the handlebar,
   wherein the theft-detection unit comprises a steering angle sensor and is configured to detect when a handlebar steering angle has been changed by a predetermined amount without a required operation having been performed, and to generate a theft-detection signal in response to such change in the steering angle.

15. A theft-deterrent device for a vehicle, comprising:
a receiver for receiving at least one lock position signal from a remote operation device;
a processor for determining whether or not an ID included in the lock position matches a stored ID;
a primary lock mechanism for responding to the lock position signal when the IDs match to lock or unlock the vehicle;
an actuator for driving the lock mechanism, and
a theft-detection unit detecting movement and for generating an alarm signal when the vehicle is moved when the receiver has not received an unlocking signal including an ID matching the stored ID, said theft-detection unit comprising a vibration sensor and being configured to detect when the vehicle is moved without a required operation having been performed, and to generate a theft-detection signal in response to such movement;
wherein the receiver, processor, primary lock mechanism, actuator and theft-detection unit are comprised in a module within a single housing.

16. The theft-deterrent device of claim 15, further comprising an alarm buzzer which is capable of being energized in response tote theft-detection signal.

17. The theft-deterrent device of claim 16, wherein the alarm buzzer is separate from a vehicle horn, and is included within said module.

18. A theft-deterrent device for a vehicle, comprising:
a receiver for receiving at least one lock position signal from a remote operation device;
a processor for determining whether or not an ID included in the lock position matches a stored ID;
a primary lock mechanism for responding to the lock position signal when the IDs match to lock or unlock the vehicle;
an actuator for driving the lock mechanism, and
a theft-detection unit detecting movement and for generating an alarm signal when the vehicle is moved when the receiver has not received an unlocking signal including an ID matching the stored ID, said theft-detection unit comprising a steering angle sensor and being configured to detect when a handlebar steering angle has been changed by a predetermined amount without a required operation having been performed, and to generate a theft-detection signal in response to such change in the steering angle;
wherein the receiver, processor, primary lock mechanism, actuator and theft-detection unit are comprised in a module within a single housing.

19. The theft-deterrent device of claim 18, further comprising an alarm buzzer which is capable of being energized in response to the theft-detection signal.

20. The theft-deterrent device of claim 19, wherein the alarm buzzer is separate from a vehicle horn, and is included within said module.

* * * * *